United States Patent [19]

Wolfe et al.

[11] 3,951,848

[45] Apr. 20, 1976

[54] BARIUM FLUOROCHLORIDE X-RAY PHOSPHORS AND METHOD OF PREPARING SAME

[75] Inventors: Robert W. Wolfe, Towanda; Russell F. Messier, Ulster, both of Pa.

[73] Assignee: GTE Sylvania Incorporated, Stamford, Conn.

[22] Filed: Apr. 28, 1975

[21] Appl. No.: 571,926

[52] U.S. Cl. .................................... 252/301.4 H
[51] Int. Cl.² ...................................... C09K 11/46
[58] Field of Search ......................... 252/301.4 H

[56] References Cited
UNITED STATES PATENTS

| | | | |
|---|---|---|---|
| 2,303,963 | 12/1942 | Uhle | 252/301.4 H |
| 3,163,610 | 12/1964 | Yocum | 252/301.4 H |
| 3,448,056 | 6/1969 | Chenot | 252/301.4 H |
| 3,630,945 | 12/1971 | Hoffman | 252/301.4 H |
| 3,702,828 | 11/1972 | Hoffman | 252/301.4 H |

OTHER PUBLICATIONS

Sommerdijk et al. "Journal of Luminescence," 1974, 8(6) pp. 502–506.

Primary Examiner—Jack Cooper
Attorney, Agent, or Firm—Norman J. O'Malley; Donald R. Castle; John C. Fox

[57] ABSTRACT

An x-ray luminescent phosphor composition consists essentially of a europium activated barium fluorochloride and an effective amount of brightness enhancement additive selected from lead, thallium and aluminum ions. The compositions are prepared by a solid state process in which a barium chloride and barium fluoride and a europium source are heated together in a non-oxidizing atmosphere with a source of lead or thallium or aluminum hydroxide. The temperatures utilized are from about 750° to 925°C for from about 1 to about 24 hours.

12 Claims, 2 Drawing Figures

BARIUM FLUOROCHLORIDE X-RAY PHOSPHORS AND METHOD OF PREPARING SAME

BACKGROUND OF THE INVENTION

1. Field of the Invention

This invention relates to alkaline earth halide x-ray phosphors. More particularly it relates to an improved europium-activated barium fluorochloride x-ray phosphor composition.

2. Prior Art

It has been known for some time that certain alkaline earth halides luminesce under x-ray excitation. U.S. Pat. No. 2,303,963 discloses a procedure for preparing barium fluorochloride. That patent, however, does not mention any activator.

Great Britain Pat. No. 1,161,871 and 1,254,271 also disclose processes for preparing various x-ray phosphors including europium-activated barium fluorochloride. Netherlands Pat. No. 7,206,945 discloses a variety of alkaline earth halides activated by europium. The intensity of emission of many of those phosphors is superior to calcium tungstate which is the present industry standard x-ray phosphor.

There is a need for a brighter x-ray phosphor because a brighter phosphor will tend to decrease the length of time of x-ray exposure required to obtain effective resolution. Alternatively, a brighter phosphor can decrease the amount of silver halide needed in the film if the exposure is held constant. The former is a health safety advantage while the latter is an economic advantage.

It is believed, therefore, that an x-ray phosphor which is brighter than the alkaline earth halides activated by europium, such as is disclosed in the prior art, would be an advancement in the art.

OBJECTS AND SUMMARY OF THE INVENTION

It is an object of this invention to provide an improved x-ray phosphor.

It is another object of this invention to provide an improved europium-activated alkaline earth halide x-ray phosphor.

It is still another object of this invention to provide a barium fluorochloride phosphor activated by europium and containing an effective amount of brightness enhancement additive.

It is a further object of this invention to provide a europium-activated barium fluorochloride phosphor containing an effective amount of a brightness enhancement additive selected from lead, thallium and aluminum and mixtures thereof.

It is an additional object of this invention to provide a process for preparing the improved europium-activated barium fluorochlorides.

These and other objects of this invention are achieved in one aspect by a composition in which a barium fluorochloride host is activated by 0.005 to 0.02 moles of europium per mole of host and which composition contains an effective amount of a brightness enhancement additive selected from lead, thallium, and aluminum.

In an additional aspect of the invention there is provided a process for preparing the phosphors. The process comprises forming a relatively uniform admixture of the appropriate amounts of barium chloride, barium fluoride, a source of europium and a suitable source of the brightness enhancement additive, thereafter, the admixture is heated in a non-oxidizing atmosphere at about 750°C to about 925°C for about 1 to 24 hours to form an x-ray phosphor having a brightness exceeding either calcium tungstate or the europium-activated barium fluorochloride disclosed in the prior art.

DETAILS OF THE PREFERRED EMBODIMENTS

Figure 1:
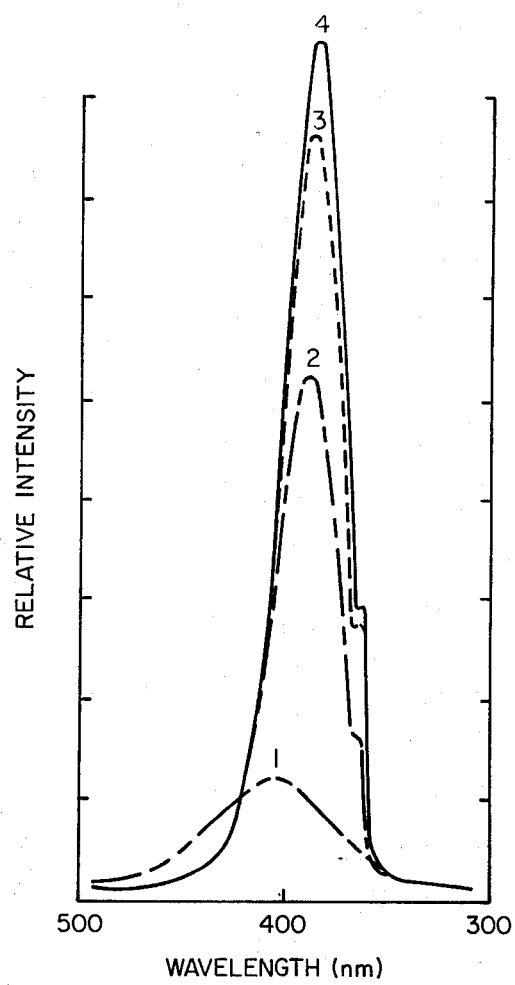
FIG. 1 is the emission spectra of the phosphors of this invention compared to two prior art phosphors.

For a better understanding of the present invention, together with other and further objects, advantages and capabilities thereof, reference is made to the following disclosure and appended claims in connection with the above-described drawings and brief description.

The most effective concentration of europium activator in the barium fluorochloride system without the brightness enhancement has been found to be from about 0.005 to about 0.035 moles of europium per mole of barium fluorochloride host. In this invention, however, less europium is required to produce the most efficient phosphor.

In the system of this invention the maximum brightness has been found to occur at about 0.01 moles of europium per mole of host as compared to 0.03 moles of europium per mole of host in a composition without the brightness enhancement additive. The lower concentration of rare earth activator decreases the cost of the phosphor. The level of europium activator is therefore between about 0.005 and 0.02 moles per mole of barium fluorochloride host in the phosphors of this invention with the preferred level being from about 0.0075 to about 0.015 moles of europium per mole of host.

The effective amounts of brightness enhancement additive has been found to vary depending upon which additive is used. Lead can be added in amounts of from about 10 to about 1,000 molar parts per million molar parts of host (used calculations on a barium basis during preparation), with from about 25 to about 125 parts per million being preferred. Thallium can be used in amounts of from about 5 to about 100 molar parts per million molar parts of barium fluorochloride (on a barium basis) with from about 10 to about 50 parts per million being preferred. Neither lead nor thallium is an effective activator when europium is not present. Suitable sources of lead and thallium are the halides, nitrates and oxides, however, the halides of lead and thallium are preferred because of their compatibility with the other materials used. Any source can be used which will form a lead or thallium ion under non-oxidizing temperature conditions of from 750°C to 925°C.

Aluminum hydroxide is the preferred source of aluminum. Other aluminum sources which can be used are aluminum fluoride, alpha-aluminum oxide, and aluminum oxalate. Amounts of aluminum are from about 0.005 moles to about 0.025 moles per mole of BaFCl. From about 0.008 to about 0.015 moles per mole of BaFCl are preferred. Chemical analysis indicates essentially all of the aluminum incorporated in the admixture is retained in the phosphor when fired in accordance with the procedures given herein. The aluminum atoms may be stuffed interstitially in the unoccupied tetrahedral sites in the BaFCl structure.

From the foregoing it is apparent that the effective amount of the additive to increase brightness will depend upon the additive used. "An effective amount" as used herein means an amount of an additive which will result in a detectable increase in brightness of a composition having a F:Cl ratio of 1 and a predetermined Eu content, in the range of from about 0.005 moles to about 0.02 moles of europium per mole of host. About 5% increase in brightness when $CaWO_4$ is used as a standard can readily be detected as a significant increase.

After a relatively uniform admixture of the barium chloride, barium fluoride and the europium source (preferably europium fluoride or europium chloride) and the desired source of brightness enhancement additive is prepared, the admixture is heated in a non-oxidizing atmosphere to prevent conversion to the oxides. A slightly reducing atmosphere is preferred. The temperature is maintained at from about 750°C to about 925°C for about 1 to about 24 hours. Temperatures lower than about 750°C do not produce a complete reaction and above about 925°C can cause some decomposition. It is preferred to heat the composition at from about 800°C to about 850°C. Lower temperatures require longer times and higher temperatures require shorter times within the above time and temperature ranges.

Anhydrous barium chloride or barium chloride dihydrate can be used as long as the appropriate amount of barium chloride and barium fluoride is used to yield BaFCl, that is a composition having a Cl:F ratio of 1.

To more fully illustrate the invention the following detailed examples are given. All parts, percentages, and proportions are by weight unless otherwise indicated.

EXAMPLE 1

Approximately 7.350 parts of $BaF_2$, 8.680 parts of $BaCl_2$, and 0.214 parts of $EuCl_2$ are blended together with approximately 0.020 parts of $PbF_2$. The starting composition of this mixture can be represented by the molar formula (BaFCl: 0.01 $EuCl_2$ 0.001 $PbF_2$). The mixture designated as "Mixture A" contains 1000 ppm $Pb^{+2}$ per mole of BaFCl host. Several samples of BaFCl: 0.01 Eu are made using portions of Mixture A to yield compositions containing various levels of $Pb^{2+}$ to a maximum of about 1,000 ppm $Pb^{2+}$. For example, approximately 7.350 parts of $BaF_2$, 8.680 parts of $BaCl_2$ and 0.214 parts of $EuCl_2$ blended with 0.081 parts of Mixture A yields a phosphor with the composition (BaFCl: 0.01 Eu:5 ppm $Pb^{2+}$). Compositions containing 0, 5, 20, and 100 ppm $Pb^{2+}$ are heated in nitrogen for 2 hours at 830°C and the phosphor, BaFCl:Eu, is produced in each case, as verified by x-ray diffraction. Curve 1, FIG. 1 shows a commercial x-ray phosphor $CaWO_4$ (a fast tungstate, Sylvania, lot PPP8089-2), as a comparison. The compositions containing $Pb^{2+}$ in the crystal structure will be much brighter than the sample containing no $Pb^{2+}$ (Curve 2, as shown in FIG. 1). Curve 3 is the sample containing 5 ppm of lead and Curve 4 represents the emission when either 20 ppm or 100 ppm of lead is employed. BaFCl:Eu, when excited by x-radiation, emits at a peak wavelength of 385 nm with an emission halfwidth of 35 nm. As FIG. 1 indicates, there is no advantages in adding $Pb^{2+}$ in concentrations over 100 ppm. For comparative purposes, the phosphors are seived to −200 +355 mesh size classification. The brightness measurements are made photometrically from powder samples of essentially infinite thickness.

EXAMPLE 2

The procedure as given in Example 1 is followed except that 0.022 parts of TlF is substitued for $PbF_2$. The brightness of phosphors made with $Tl^{1+}$ addition are comparable to those containing lead except the brightness reaches a maximum at about 10 ppm with a useful limit of $Tl^{1+}$ additions at about 50 ppm.

EXAMPLE 3

Figure 2:
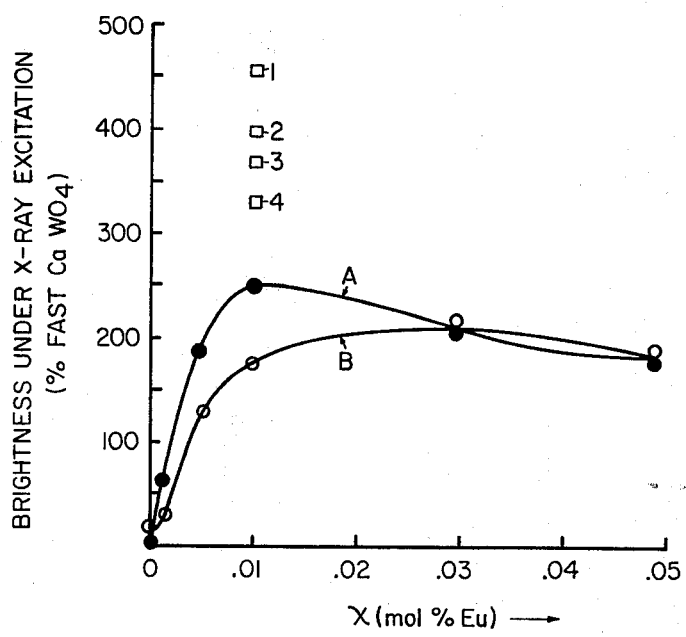
FIG. 2 is a graph illustrating the relative brightness of the phosphors of this invention compared to phosphors without the brightness enhancement additive.

The procedure as given in Example 1 is followed except that the $Pb^{2+}$ is kept constant at 50 ppm and the $Eu^{2+}$ content varied as follows: BaFCl:50 parts per million $Pb^{2+}$; 0.00, 0.002, 0.005, 0.010, 0.030, 0.050 $EuCl_2$. In this series, the brightness of the phosphors under x-ray excitation, relative to a commercial x-ray phosphor, $CaWO_4$, are given in Curve A, FIG. 2. For comparison, the identical tests are run except the 50 ppm $Pb^{2+}$ is omitted. The brightness is plotted in Curve B of FIG. 2. Samples are fired at 800°C in a flowing nitrogen atmosphere for 2 hours. These phosphors containing $Pb^{2+}$ show a significant increase in brightness over those phosphors containing no $Pb^{2+}$ (Curve A, FIG. 2) over the composition range for Eu of 0.002 to 0.01 mole percent. Also, as seen in FIG. 2, Curve A, the $Pb^{2+}$ by itself does not activate the BaFCl matrix.

EXAMPLE 4

The following materials are mixed and fired at 800°C in nitrogen for 2 hours:

| | |
|---|---|
| $BaCl_2.2H_2O$ | 6.107 parts |
| $BaF_2$ | 4.408 parts |
| $EuCl_2$ | 0.128 parts |
| $Al(OH)_3$ | 0.195 parts |

The resulting phosphor has the composition BaFCl:0.01 Eu, 0.05 Al. The brightness under x-ray excitation is 335% of the brightness of $CaWO_4$ (FIG. 2, Point 4).

EXAMPLE 5

The procedure as given in Example 1 is followed except that the Pb is kept constant at 50 ppm, the Eu content is kept constant at 0.01 moles per mole BaFCl, and $Al(OH)_3$ is added to the mixture before firing in the concentrations 0.01, 0.03, and 0.05 moles per mole BaFCl. The compositions are fired in a nitrogen atmosphere at 800°C for 2 hours and resulted in brightness superior to all of the previously mentioned examples (see FIG. 2, Points 1, 2, and 3). The brightest phosphor (FIG. 2, Point 1) is 245% brighter than the corresponding phosphor without the Pb and Al additions.

Although the fluorides of $Pb^{2+}$ and $Tl^+$ are used in the examples, any salt such as chlorides, nitrates, or oxides may be used to advantage. Also, the firing temperature and time are not critical except that the $Tl^+$ is extremely volatile and a larger amount will be needed if the phosphor is fired at a higher temperature and/or a longer time. In general, a temperature from about 750°C – 925°C with a firing time of from 1–24 hours will produce a satisfactory material. The firing atmosphere can be either neutral or slightly reducing.

While there has been shown and described what are at present considered the preferred embodiments of the invention, it will be obvious to those skilled in the art that various changes and modifications may be made therein without departing from the scope of the invention as defined by the appended claims.

What is claimed is:

1. An x-ray luminescent composition consisting essentially of a host of BaFCl, from about 0.005 moles to about 0.02 moles of europium per mole of host as an activator and an effective amount of a brightness enhancement additive selected from the group consisting of lead, thallium, and aluminum and mixtures thereof, said effective amount being from about 5 to about 100 molar parts per million of said host when said additive is thallium; from about 10 to about 1000 molar parts per million of said host when said additive is lead; and from about 0.005 moles to about 0.025 moles per mole of said host when said additive is aluminum.

2. A composition according to claim 1 wherein said additive is thallium from about 5 to about 100 molar parts per million of said host.

3. A composition according to claim 1 wherein said additive is lead from about 10 to about 1,000 molar parts per million of said host.

4. A composition according to claim 1 wherein said additive is aluminum from about 0.005 moles to about 0.025 moles per mole of said host.

5. A composition according to claim 1 wherein said additive is lead from about 10 to about 1,000 molar parts per million of said host and aluminum from about 0.005 moles to about 0.025 moles per mole of said host.

6. A composition according to claim 5 wherein said europium is from about 0.0075 to about 0.015 moles per mole of host.

7. A process for preparing an x-ray phosphor composition comprising:
  a. forming a uniform admixture of equimolar amount of barium fluoride and barium chloride, a europium source that furnishes from about 0.005 moles to about 0.02 moles of europium per mole of barium and an effective amount of source of a brightness enhancement additive selected from thallium, lead, and aluminum, said effective amount, when said additive is thallium, being that which furnishes from about 5 to about 100 molar parts of thallium per million molar parts of barium in the phosphor composition; when said additive is lead, being that which furnishes from about 10 to 1,000 molar parts of lead per million molar parts of barium in the phosphor composition and when said additive is aluminum, said effective amount being that which furnishes from about 0.005 to about 0.025 moles of aluminum per mole of barium in said composition; said source of thallium, lead and aluminum yielding thallium, lead and aluminum ions under non-oxidizing conditions at a temperature of from about 750°C to about 925°C; and
  b. heating said admixture under a non-oxidizing atmosphere at a temperature of from about 750°C to about 925°C for from about 1 to 24 hours.

8. A process according to claim 7 wherein said additive is lead and said source is lead fluoride.

9. A process according to claim 7 wherein said additive is thallium and said source is thallium fluoride.

10. A process according to claim 7 wherein said additive is aluminum and said source is aluminum hydroxide.

11. A process according to claim 7 wherein said europium source is europium chloride and is at a level in said admixture of about 0.01 moles of europium per mole of barium.

12. A process according to claim 11 wherein said admixture contains about 25 to about 125 molar parts of a lead source per million parts of barium and from about 0.008 moles to about 0.015 moles of aluminum hydroxide per mole of barium.

* * * * *